United States Patent Office 3,448,137
Patented June 3, 1969

3,448,137
METHOD OF PREPARING 4-ALKYL-2,2-DI-METHYL-2-SILAMORPHOLINES
Hans Niederprüm, Monheim, and Walter Simmler, Odenthal-Schlinghofen, Germany, assignors to Farbenfabriken Bayer Aktiengesellschaft, Leverkusen, Germany, a corporation of Germany
No Drawing. Filed Mar. 24, 1966, Ser. No. 536,985
Claims priority, application Germany, Apr. 3, 1965,
F 45,715
Int. Cl. C07f 7/10
U.S. Cl. 260—448.8
2 Claims

ABSTRACT OF THE DISCLOSURE

Process of recovering 4-alkyl-2,2-dimethyl-2-silamorpholines from the mixture of reaction products formed by reacting a corresponding halomethyl-dimethyl-silane with a corresponding β-(alkylamino)ethanol and a tertiary nitrogen base in an inert solvent, in which the unseparated mixture of reaction products is mixed with alkali metal hydroxide in aqueous solution (optionally with prior intermediate dissolution of such reaction products in aqueous hydrochloric acid and separation from the solvent thus precipitated), and the nonaqueous phase which contains the tertiary nitrogen bases is removed and such nonaqueous phase decomposed by fractional distillation, whereby to obtain the corresponding silamorpholine formed, such silamorpholines being useful as stable surfactants.

---

The invention relates to heterocyclic compounds, and is especially concerned with the production of heterocyclic compounds of the formula

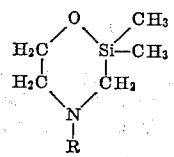

in which R denotes an alkyl radical containing 1 to 6 carbon atoms.

Of these 2-silamorpholine derivatives, only 2,2,4-trimethyl-2-silamorpholine has hitherto been described in the literature ["Chemische Berichte," vol. 96 (1963), pages 351 and 355]. This compound was prepared by boiling bromomethyl-dimethyl-chlorosilane or bromomethyl-dimethyl-ethoxysilane with β-(methylamino)ethanol and triethylamine in a benzene solution for 7 hours, filtering off the precipitated salt and evaporating the filtrate. However, it was only possible to obtain a yield of at most 62% of the theoretical amount, although it was possible to prove by titration analysis of the filter residue that the initially carbon-bound bromine had been converted almost completely into electrolytically dissociated bromide.

Our detailed investigations have now shown that the filter residue contains a substantial proportion of the product of the process and that this is mainly due to halide formation by the product itself, which competes considerably with that of the triethylamine. It is the object of the present invention to provide an improvement of the known method of production whereby the economy of the process with regard to yield and to recovery of the tertiary amine and the solvent is enhanced, and the purity of the products is increased.

According to the present invention a method of preparing the 2-silamorpholine derivaties defined above comprises reacting a halomethyl-dimethyl-silane derivative of the general formula X—Si(CH₃)₂—CH₂—Y, wherein X is $CH_3$—O—, $C_2H_5$—O—, $C_3H_7$—O— or Cl, and Y is Cl or Br, with a β-(alkylamino)ethanol of the general formula R—NH—$CH_2$—$CH_2$—OH, wherein R is an alkyl radical containing 1 to 6 carbon atoms, and a tertiary nitrogen base in an inert solvent, mixing the unseparated mixture of reaction products, which may be dissolved in aqueous hydrochloric acid and, in this case, freed from the precipitated solvent, with an alkali metal hydroxide in aqueous solution, removing the nonaqueous liquid phase which contains the tertiary nitrogen bases and any nonaqueous solvents which may be present, and decomposing this phase by fractional distillation.

The choice of the initial tertiary nitrogen base and the solvent depends on questions of economy and boiling points; triethylamine and benzene are very suitable. Since especially the lower members of the homologous series of 4-alkyl-2,2-dimethyl-2-silamorpholines are not very soluble in water, it is recommended, in order to increase the yield, that the aqueous alkali metal salt solution, after separation of the amine phase, be treated with an inert extracting agent, e.g. ether, and that the extract be added to the amine phase.

Compared with the known process, in which any residual alkylamino-ethanol as well as a small proportion of the amine salts remain in the filtrate after the reaction and pass into the distillate of the main product, the process according to the invention yields a purer product, since the alkylaminoethanol is taken up by the aqueous phase and the amine salts are decomposed. Furthermore, a shorter reaction time is achieved because a substantial part of the reaction product is initially precipitated in the form of the halide, and in the known process the reaction of this halide with the tertiary amine added for binding the halogen requires additional time, besides being incomplete. By further modifying the process in such a manner that all the reaction products are first dissolved in aqueous hydrochloric acid before adding the alkali metal hydroxide, there is obtained the advantage of recovering the solvent employed without distillation.

The process according to the invention is made possible by a fact which was not to be foreseen, viz. that the reaction products are not hydrolytically attacked to a noticeable extent by the aqueous alkaline medium or in the aqueous acid solution, although they are esters of a silanol and it is known that open chain aminomethylalkoxysilanes, i.e., for example

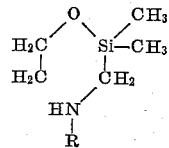

are completely hydrolyzed and condensed to form the disiloxane under analogous conditions, i.e., also in a water-immiscible solvent. The other known heterocyclic compounds of analogous structure, i.e., the 2,2-dimethyl-2-sila derivatives of piperazine, 1-oxacyclohexane, 1,4-dioxan, 1-oxa-4-thiane and 1,4-dithiane and the corresponding open chain β-ethylamino, β-ethoxy and β-ethylmercapto compounds, show the same behaviour; the special position of the 2-silamorpholine ring cannot be, explained at present.

The following examples, which describe the production of some new 4-alkyl-2,2-dimethyl-2-silamorpholines, are given for the purpose of illustrating the invention. Like the known 4-methyl derivative, these compounds are valuable surfactants of outstanding stability.

EXAMPLE 1

985 grams (5 mols) bromomethyl-dimethyl-ethoxysilane and 506 g. (5 mols) triethylamine are dissolved in 1 litre anhydrous benzene. A solution of 413 g. (5.5 mols) β-(methylamino)ethanol in 500 cc. benzene is added dropwise to this solution over a period of about 15 minutes, and the mixture is heated at boiling temperature under reflux for 5 hours.

To the mixture so obtained and cooled to room temperature, a solution of 240 g. (6 mols, 20% excess) sodium hydroxide in 2 litres water is added with stirring. The two liquid phases are then separated from one another, the aqueous phase is extracted by shaking with 200 cc. benzene and the benzene solutions are combined. The benzene and triethylamine are distilled off therefrom through a column and in this way both are recovered for reuse, after separation of a small amount of water which has been codistilled azeotropically. The distillation is continued, the product is finally driven over between 140 and 145° C. and there are obtained 610 g. (84% of the theoretical amount) of 2,2,4-trimethyl-2-silamorpholine which has a refractive index $n_D^{20} = 1.4352$ and can be identified by spectroscopy (infra-red and nuclear magnetic resonance).

EXAMPLE 2

The process described in Example 1 is repeated with the exception that the methylaminoethanol is replaced by 5.5 mols β-(ethylamino)ethanol. The somewhat water-soluble product, 4-ethyl-2,2-dimethyl-2-silamorpholine with a refractive index $n_D^{20} = 1.4388$ and a boiling point of 55° C./13 mm. Hg, is finally obtained in a yield of 82% of the theoretical amount.

EXAMPLE 3

Example 1 is again repeated with the exception that the methylaminoethanol is replaced by 5.5 mols β-(n-propylamino)ethanol. The resulting 4-n-propyl-2,2-dimethyl-2-silamorpholine, of refractive index $n_D^{20} = 1.4391$ and a boiling point between 59 and 62° C. at 11 mm. Hg, is finally obtained in a yield of 92% of the theoretical amount.

EXAMPLE 4

750 grams (4 mols) bromomethyl-dimethyl-chlorosilane are added dropwise over a period of 2 hours, while stirring, to a mixture of 330 g. (4.4 mols) β-(methylamino)ethanol, 891 g. (8.8 mols) triethylamine and 3 litres anhydrous benzene. The reaction mixture thereby warms up to about 80° C. It is then heated at boiling temperature under reflux for 5 hours.

After the mixture has cooled to room temperature, 352 g. (8.8 mols) sodium hydroxide dissolved in 1 litre water are added, the aqueous phase is separated and extracted by shaking with 200 cc. ether, and the benzene and ether solutions are combined. From this mixture there are distilled through a column first ether, benzene and triethylamine and finally the product of the process. There are obtained 440 g. (about 76% of the theoretical amount) of 2,2,4-trimethyl-2-silamorpholine with a boiling point between 142 and 146° C. and a refractive index $n_D^{20} = 1.4350$.

EXAMPLE 5

572 grams (4 mols) chloromethyl-dimethyl-chlorosilane are added dropwise over a period of about 2 hours to a solution of 330 g. (4.4 mols, 10% excess) β-(methylamino)ethanol and 890 g. (8.8 mols, 10% excess) triethylamine in 2.5 litres anhydrous benzene, and the mixture is heated at boiling temperature under reflux for 4 hours.

The mixture is then allowed to cool to room temperature and is mixed, while cooling, with 1.3 litres 4.6 N hydrochloric acid (6 mols HCl), whereby all the nitrogen compounds pass into the aqueous solution. This is separated and stirred, while cooling, with 640 g. (16 mols, 15% excess) solid sodium hydroxide. The amine phase precipitated thereby is removed from the aqueous salt solution, and after the residual benzene and water and the whole of the triethylamine, 2,2,4-trimethyl-2-silamorpholine is finally distilled therefrom between 140 and 146° C. in a yield of 73% of the theoretical amount; refractive index $n_D^{20} = 1.4349$.

EXAMPLE 6

132 grams (1.13 mols) β-(n-butylamino)ethanol are added dropwise over a period of one hour to a solution of 223 g. (1.13 mols) bromomethyl-dimethyl-ethoxysilane and 115 g. (1.13 mols) triethylamine in 300 cc. benzene and the mixture is heated at boiling temperature under reflux for 2 hours.

The mixture is then allowed to cool to room temperature and is mixed with 300 cc. aqueous hydrochloric acid containing 15 percent by weight HCl. The benzene phase is separated off and the aqueous phase is stirred with 100 g. sodium hydroxide. The amine phase precipitated thereby is removed from the aqueous salt solution, the latter is extracted by shaking with 100 cc. ether, and the extract and the bulk of the amines are combined for a fractional distillation from which 190 g. (about 90% of the theoretical amount) 4-n-butyl-2,2-dimethyl-2-silamorpholine are finally obtained; the product can be identified by spectroscopy, it has a boiling point of 80° C. at 12 mm. Hg and a refractive index $n_D^{20} = 1.4418$.

What we claim is:

1. In the process of recovering 4-alkyl-2,2-dimethyl-2-silamorpholine of the formula

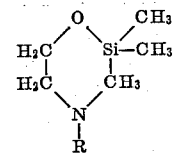

in which R is alkyl containing 1 to 6 carbon atoms, from the mixture of reaction products formed by reacting a halomethyl-dimethyl-silane of the formula

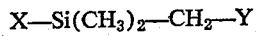

in which X is selected from the group consisting of chlorine and alkoxy containing 1 to 3 carbon atoms and Y is selected from the group consisting of chlorine and bromine, with a β-(alkylamino)ethanol of the formula R—NH—CH₂—CH₂—OH, in which R is the same as defined above, and a tertiary nitrogen base in an inert solvent, the improvement which comprises mixing the unseparated mixture of reaction products with an alkali metal hydroxide in aqueous solution, removing the nonaqueous phase which contains the tertiary nitrogen bases, and decomposing such nonaqueous phase by fractional distillation to obtain the corresponding silamorpholine formed.

2. Improvement according to claim 1 wherein the unseparated mixture of reaction products is first dissolved in aqueous hydrochloric acid, then separated from the solvent thus precipitated, and thereafter mixed with the alkali metal hydroxide.

References Cited

Simmler: "Chemical Abstracts," 58, 1963, p. 10230(d).

TOBIAS E. LEVOW, *Primary Examiner*.

P. F. SHAVER, *Assistant Examiner*.

UNITED STATES PATENT OFFICE

CERTIFICATE OF CORRECTION

Patent No. 3,448,137　　　　　　　Dated June 3, 1969

Hans Niederprüm et al.

It is certified that errors appear in the above-identified patent and that said Letters Patent are hereby corrected as shown below:

Column 2, line 50, in the formula, "$\begin{array}{c}H_2C\\|\\H_2C\end{array}$" should be -- $\begin{array}{c}H_2C\\|\\H_3C\end{array}$ --

Column 4, line 36, in the formula,

"$\begin{array}{c}\phantom{Si}\diagdown\phantom{Si}\diagup CH_3\\Si\!-\!\!-CH_3\\|\\\diagup CH_3\end{array}$" should be $\begin{array}{c}\phantom{Si}\diagdown\phantom{Si}\diagup CH_3\\Si\!-\!\!-CH_3\\|\\\diagup CH_2\end{array}$ --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents